US007768154B2

(12) United States Patent
Taylor et al.

(10) Patent No.: US 7,768,154 B2
(45) Date of Patent: Aug. 3, 2010

(54) INVERTER BUS STRUCTURES AND ASSOCIATED METHODS

(75) Inventors: William Fillmore Taylor, Bend, OR (US); Brian John Hoffman, Bend, OR (US)

(73) Assignee: PV Powered, Inc., Bend, OR (US)

( * ) Notice: Subject to any disclaimer, the term of this patent is extended or adjusted under 35 U.S.C. 154(b) by 238 days.

(21) Appl. No.: 11/872,680

(22) Filed: Oct. 15, 2007

(65) Prior Publication Data

US 2008/0180979 A1 Jul. 31, 2008

Related U.S. Application Data

(60) Provisional application No. 60/851,675, filed on Oct. 13, 2006.

(51) Int. Cl.
*H02J 1/10* (2006.01)
*H02M 3/335* (2006.01)

(52) U.S. Cl. .......................................... 307/82; 363/16

(58) Field of Classification Search .................. 307/45, 307/58, 82, 6, 151; 363/15, 16
See application file for complete search history.

(56) References Cited

U.S. PATENT DOCUMENTS

| 3,629,600 | A | * | 12/1971 | Stuler et al. | 307/66 |
| 3,823,358 | A | * | 7/1974 | Rey | 320/101 |
| 4,144,462 | A | * | 3/1979 | Sieron et al. | 307/66 |
| 7,057,308 | B2 | * | 6/2006 | Stranberg et al. | 307/66 |

* cited by examiner

*Primary Examiner*—Albert W Paladini
(74) *Attorney, Agent, or Firm*—Perkins Coie LLP

(57) ABSTRACT

Inverter bus structures, assemblies and associated methods are disclosed herein. One embodiment of the disclosure, for example, is directed to a power inverter including an inverter module for converting DC power to AC power, a printed circuit board carrying a capacitor array, a DC power source, and a bus structure. The bus structure is physically coupled each of the inverter module and the printed circuit board, and the bus structure electrically couples each of the inverter module, the printed circuit board to the DC power source.

20 Claims, 5 Drawing Sheets

INVERTER BUS STRUCTURES AND ASSOCIATED METHODS

CROSS-REFERENCE TO RELATED APPLICATION

This application claims the benefit of U.S. Provisional Patent Application No. 60/851,675, filed Oct. 13, 2006, and which is incorporated herein by reference.

TECHNICAL FIELD

The present disclosure is directed to bus structures for power inverters, and associated methods.

BACKGROUND

The solar energy industry is expanding at a rapid pace. Much of this expansion is due to an increase in residential and commercial photovoltaic (PV) arrays that convert light into electrical power. Although PV arrays can be connected to a utility power grid, PV arrays output direct current (DC) power and utility power grids require alternating current (AC) power input. As a result, inverters are typically used to convert the DC power produced by the PV arrays into the AC power required by utility grids.

A typical high current inverter includes an integrated power module (IPM) with power electronics and switching devices to form the AC output. The DC power is typically fed to a printed circuit board (PCB) attached to input terminals of the IPM. The PCB carries one or more capacitors are used as a low impedance power storage source. Accordingly, all of the DC power source flows through the PCB to provide the input to the IPM.

FIG. 1, for example, is a schematic diagram of several components that can provide a low impedance, high frequency input required by a typical inverter. More specifically, FIG. 1 illustrates a DC power source input 102 coupled to a PCB 104. The PCB 104 carries a storage circuit including one or more capacitors 106 and is also coupled an IPM 108. In operation, current flows from the DC source 102 to the PCB 104 as indicated by a first arrow 104. The current then flows from the PCB 104 to the IPM 108, as indicated by a second arrow 112. The current accordingly flows through the PCB 104, and the capacitors 106 can store the current to deliver it when needed by the IPM 108. As such, the capacitors 106 are able to provide high frequency current at a low impedance to the IPM 108. In this configuration, all of the current from the DC source 102 passes through the PCB 104 before reaching the IPM 108.

DETAILED DESCRIPTION

A. Overview

Figure 1:
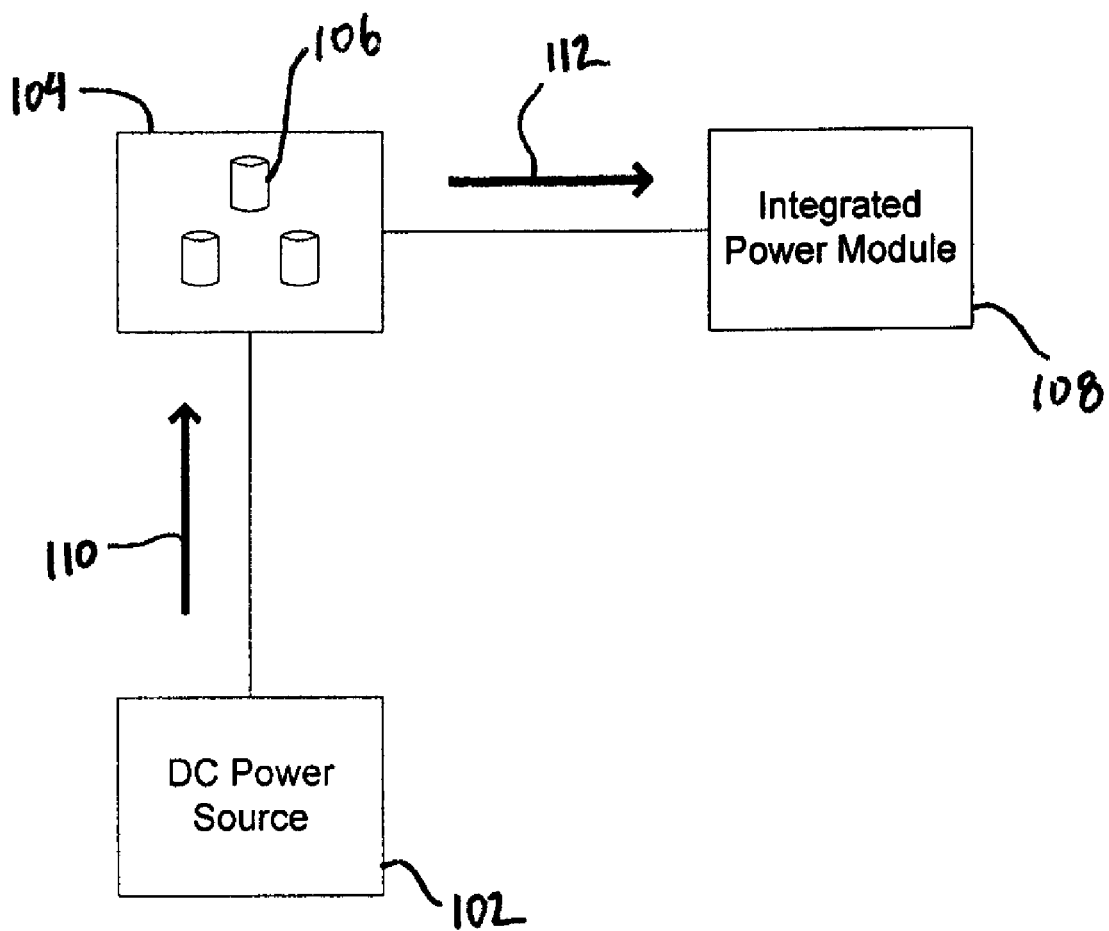
FIG. 1 is a schematic diagram of several components of a conventional inverter.

The following disclosure describes several embodiments of bus structures for power inverters and associated methods. One embodiment of the disclosure, for example, includes an electrical power inverter including an inverter module for converting direct current (DC) power to alternating current (AC) power. The module has an input terminal that is electrically coupled to a conductive contact area of a printed circuit board. The inverter also includes a bus structure physically and electrically coupled to the input terminal and the contact area. The inverter further includes a DC power supply electrically coupled to the bus structure.

Another aspect of the disclosure is directed to a power inverter including a DC power source coupled to a bus structure. The inverter also includes a printed circuit board having a contact site. The contact site is physically and electrically coupled to the bus structure. The inverter further includes at least one capacitor carried on the printed circuit board, and the capacitor is operably coupled to the contact site. The inverter also includes an inverter module for converting DC power to AC power, and an input terminal physically and electrically coupled to the bus structure.

A further embodiment of the disclosure is directed to a power inverter including an inverter module for converting DC power to AC power, a printed circuit board carrying a capacitor array, a DC power source, and a bus structure. The bus structure is physically coupled each of the inverter module and the printed circuit board, and the bus structure electrically couples each of the inverter module, the printed circuit board to the DC power source.

Another aspect of the disclosure is directed to a method of manufacturing an inverter for converting DC power to AC power. The method includes providing an inverter module having circuitry configured for converting DC power into AC power. The module includes an input terminal, and the method also includes physically and electrically coupling a bus structure to the input terminal. The method further includes coupling a printed circuit board to the bus structure. The printed circuit board is physically and electrically coupled to the bus structure and electrically coupled to the input terminal. The method also includes coupling a DC power source to the bus structure.

Another embodiment of the disclosure is directed to a method of converting DC power to AC power with an inverter. This embodiment includes providing a flow of current from a DC power source to a bus structure. The bus structure operably couples an inverter module to a printed circuit board carrying a storage circuit. The method also includes flowing the current from the bus structure either directly to the inverter module or through the storage circuit to the inverter module.

Specific details of several embodiments of the disclosure are set forth in the following description and FIGS. 2A-6 to provide a thorough understanding of these embodiments. A person skilled in the art, however, will understand that the disclosure may be practiced without several of these details or additional details can be added to the disclosure. Moreover, several details describing well-known structures or processes often associated with inverter bus structures are not shown or described below in detail to avoid unnecessarily obscuring the description of the embodiments of the disclosure. Where the context permits, singular or plural terms may also include the plural or singular term, respectively. In addition, unless the word "or" is expressly limited to mean only a single item exclusive from the other items in reference to a list of two or more items, the use of "or" in such a list is to be interpreted as including (a) any single item in the list, (b) all of the items in the list, or (c) any combination of the items in the list. Furthermore, the term "comprising" is used throughout to mean including at least the recited feature(s) such that any greater number of the same feature or additional types of features are not precluded.

B. Embodiments of Inverter Bus Structures and Associated Methods

Figure 2A:
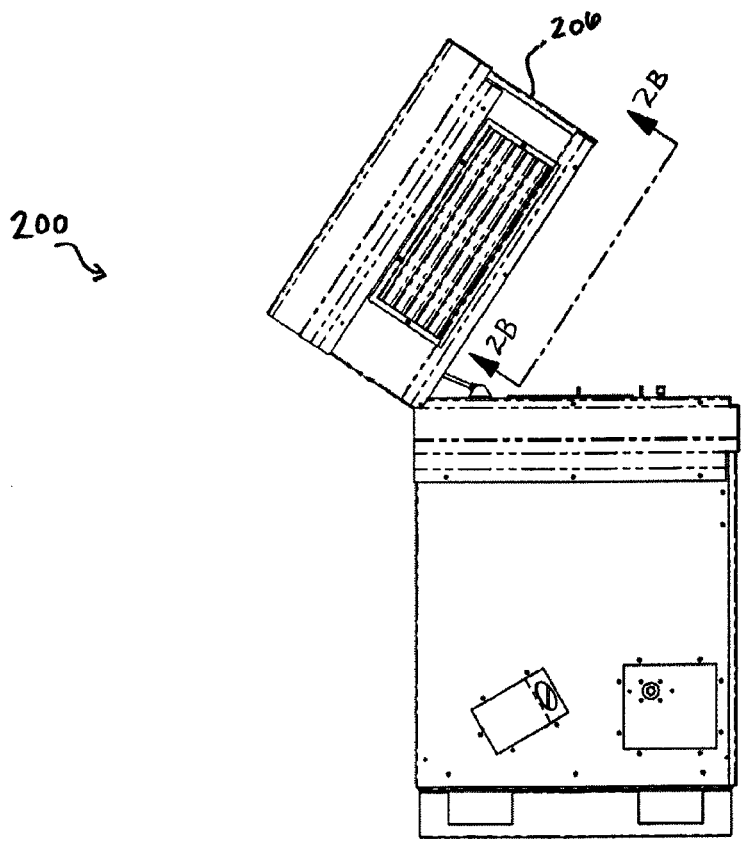
FIG. 2A is a side view of a power inverter configured in accordance with an embodiment of the disclosure.
Figure 2B:
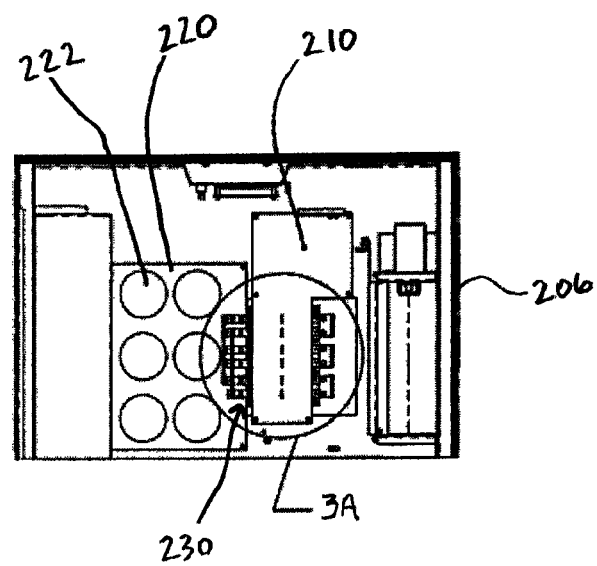
FIG. 2B is an enlarged bottom view taken along the line 2B-2B in FIG. 2A showing components of the inverter configured in accordance with an embodiment of the disclosure.

FIG. 2A is a side view of an inverter 200 configured in accordance with an embodiment of the disclosure, and FIG. 2B is an enlarged bottom view of a portion of the inverter 200 along the line 2B-2B in FIG. 2A. Referring to FIGS. 2A and 2B together, the illustrated inverter 200 includes an upper portion 202 partially opened with reference to a lower portion 204. An enclosure 206 houses at least some of the electrical components used to convert DC power to AC power. More specifically, the inverter 200 includes a converting module (e.g., an integrated power module) 210 operably coupled to a printed circuit board (PCB) 220. The module 210 includes power electronics circuitry as is known in the art to convert DC power input to the module 210 into AC power output by the module 210. The PCB 220 includes printed circuitry or other electrically conductive components and carries a capacitor array of one or more capacitors 222. In certain embodiments, the capacitors 222 can be electrically coupled in a storage circuit. The inverter 200 also includes a bus structure 230 to couple the module 210 and the PCB 220 to a DC power source (not shown in FIGS. 2A and 2B). In certain embodiments, the bus structure 230 physically and electrically couples the PCB 220 to the module 210. The bus structure 230 is also configured to connect to wires or other conductors from the DC power source. In certain embodiments, the DC power source is a photovoltaic (PV) array. In other embodiments, however, the DC source can have other configurations suitable to provide DC power input to the inverter.

The DC power source supplies power to the inverter 200 with a relatively low variation in voltage and current. In certain embodiments, the module 210 can be configured to use high frequency power wave modulation (PWM) to create the AC waveform output. The module 210 can use current drawn at high frequencies. The DC power source can feed power directly to the module 210 or to the PCB 220, and the capacitors 222 store and release the power to the module 210 as needed. Accordingly, the module 210 can draw current from the DC source alone or in combination with the capacitors 222 carried on the PCB 220.

As described in more detail below, the illustrated embodiment does not require that all of the current from the DC source flow through the PCB 220 to reach the module 210. As such, the embodiments disclosed herein can reduce the heat generated in the inverter 200 and also provide a reliable connection for the larger wires or conductors typically used with inverters. For example, high current inverters generally use conductors having a relatively large cross-sectional area to feed the DC current to the module 210 in an attempt to preserve power and reduce heat generation. Conductors having a smaller cross-section can have an excessive resistance or impedance that dramatically increases the power loss. The increased resistance or impedance can also generate significant amounts of heat that can reduce the reliability and longevity of the inverter.

Another benefit of the embodiments of the bus structure 230 disclosed herein is that they facilitate the physical connection, in addition to the electrical connection, between the module 210, the PCB 220 and the bus structure 230. For example, when processing a PCB 220 it can be difficult to achieve large cross-sections of high conductivity copper on the PCB 220. PCB's associated with conventional high current inverters are typically built of an electrochemically deposited copper, which can be brittle. Circuit board processes that build up large copper cross sections are specialized and sacrifice many advantages of typical PCB's, including low cost construction and the ability to contain finely detailed structures. Furthermore, it can also be difficult to connect large wires to these types of PCB's. For example, large wires or conductors are usually connected with large terminal lugs. These connections can be problematic as the torque and pressure needed to secure the wires to the PCB can distort the PCB. As the PCB expands and contracts due to thermal changes, for example, these connections can be stressed and crack or loosen. Accordingly, the embodiments disclosed herein include bus structures having a large cross sectional area to carry the DC power with a low resistance. This configuration allows the capacitors 222 on the PCB 220 to be electrically coupled to the module 210 while keeping impedance low.

Figure 3A:
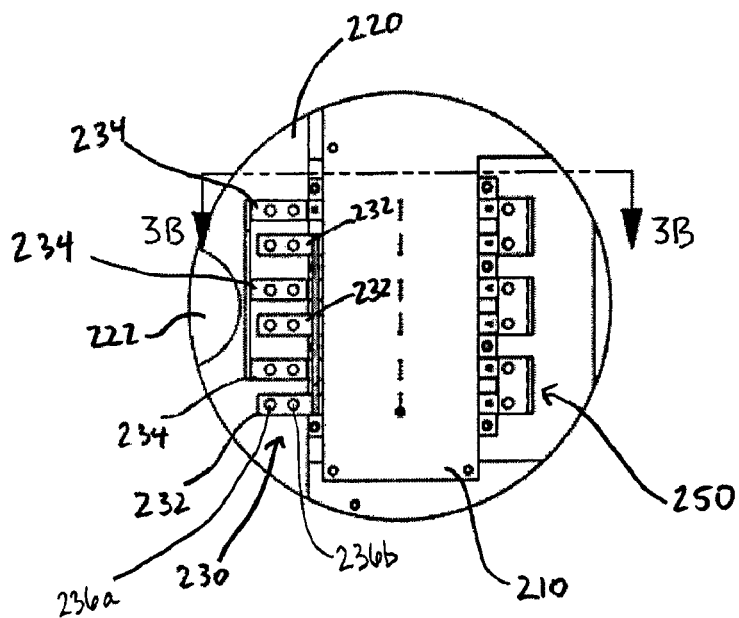
FIG. 3A is an enlarged detail view of the components shown in FIG. 2B.
Figure 3B:
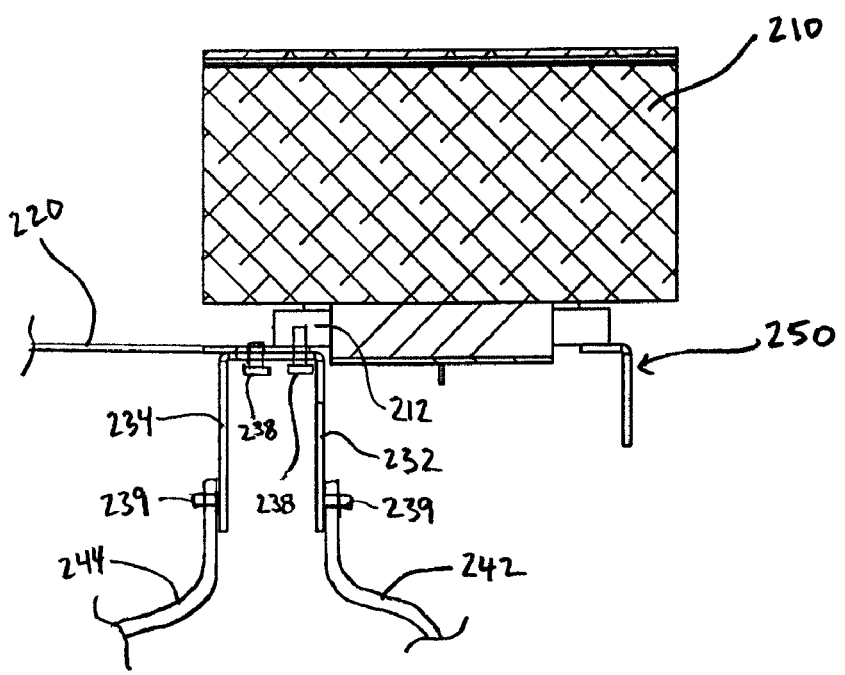
FIG. 3B is an enlarged side cross-sectional view taken along the line 3B-3B in FIG. 3A showing the components of FIG. 3A.

The physical and electrical connections of the bus structure 230 are illustrated in more detail in FIGS. 3A and 3B. FIG. 3A, more specifically, is an enlarged detail view of the components of the inverter 200 of FIGS. 2A and 2B, and FIG. 3B is a side cross-sectional view of these components taken along the line 3B-3B in FIG. 3A. Referring to FIGS. 3A and 3B together, the illustrated bus structure 230 includes a plurality of interconnected negative bus bars 232 and a plurality of interconnected positive bus bars 234. The negative bus bars 232 can electrically connect to specific circuits on the PCB 220 and with a negative side of a corresponding capacitor 222. The positive bus bars 234 can also connect to circuits on the PCB 220 and a positive side of a corresponding capacitor 222. The bus bars 232, 234 can also be coupled to corresponding input terminals 212 of the module 210. The module 210 also includes a plurality of output terminals 250 to facilitate connection to an AC load, such as a utility grid. In certain embodiments, the bus bars 232, 234 can be made of electrical grade copper sheet stock. In other embodiments, however, the bus bars 232, 234 can be formed from any other material suitable for coupling the components of the inverter 200.

In certain embodiments, the individual bus bars 232, 234 physically and electrically couple the PCB 220 to the module 210. For example, in some embodiments, the individual bus bars 232, 234 include a plurality of openings 236 (identified individually as first openings 236a and second openings 236b). The openings 236 extend through an upper portion of the bus bars 232, 234 to enable connection to each of the PCB 220 and the module 210. For example, the first opening 236a can be used to couple bus bars 232, 234 to the PCB 220, and the second opening 236b can be used to couple the bus bars 232, 234 to both the PCB 220 and the terminal 212 of the module 210. As such, in the illustrated configuration power flowing from a DC source to the corresponding bus bars 232, 234 is coupled directly to both the module 210 and the PCB 220. More specifically, and as illustrated in FIG. 3B, a negative DC power source line 242 can be coupled to the negative bus bar 232, and a positive DC power source lines 244 can be coupled to the positive bus bar 234. The bus bars 232, 234 can each have a protrusion (e.g., stud) 239 for physically and electrically coupling to fasteners (e.g., crimp lugs) of the DC power source lines 242, 244.

In this embodiment, a portion of the PCB 220 is physically attached and electrically connected directly to the module terminal 212, as well as to the bus structure 230. As such, the portion of the PCB 220 connected to the module 210 can include a conductive contact area or site (e.g., a terminal, pad, etc.) to facilitate the electrical connection. In certain embodiments, conductive fasteners 238 (e.g., bolts, screws, etc.) can extend through the openings 236 to physical couple the PCB 220 to the module terminal 212 and enhance the electrical conductivity therebetween. For example, the fasteners 238 can thread through the PCB 220 directly into the module terminal 212. In certain embodiments, the fasteners 238 can be formed of a conductive material, such as copper, brass, alloys of these or other suitable materials. In other embodiments, the connections between the module 210, PCB 220 and bus structure 230 can include other configurations for physically and electrically coupling these components. For example, in certain embodiments, the bus bars 232, 234 can be mounted above or below the PCB 220.

One feature of at least some of the foregoing embodiments is that the bus structure 230 provides a secure mechanical, as well as electrical, connection between the module 210 and the PCB 220. This is unlike existing inverters because the PCB of an existing inverter is typically connected to corresponding components with a wire having a relatively large diameter. As explained above, these large wires having crimp lugs can be problematic to physically attach to the PCB. The wires can also damage the PCB due to the heat generated from the electrical conductivity. In the illustrated embodiment, however, the PCB 220 is coupled directly to module 210. The bus structure 230 securely fastens the PCB 220 to the module 210 with a low impedance connection to reduce heat generation. An additional advantage is that the current can flow directly to the module 210 from the bus structure 230 (e.g., through the fastener 238) or through a relatively short section of the PCB 220. The illustrated configuration also reduces the stresses on the PCB 220 at the physical connection points.

In a specific embodiment, and as illustrated in FIGS. 3A and 3B, the bus structure 230 includes three interconnected negative bus bars 232 and three interconnected positive bus bars 234. Multiple bus bars 232, 234 that are connected to the PCB 220 provide the advantage of creating multiple short paths for the current to travel from the PCB 220 to the module 210. In a typical inverter, for example, the current travels from a PCB to an inverter module through a single connection, such as a stud connected to a crimp lug from a wire. A single connection provides only one path for the current to flow from the PCB to the module, and therefore increases the impedance and heat generation at that single connection. The illustrated bus structure 230, however, provides a greater area of contact between the PCB 220 and the bus bars 232, 234 by providing multiple connections.

Figure 4:
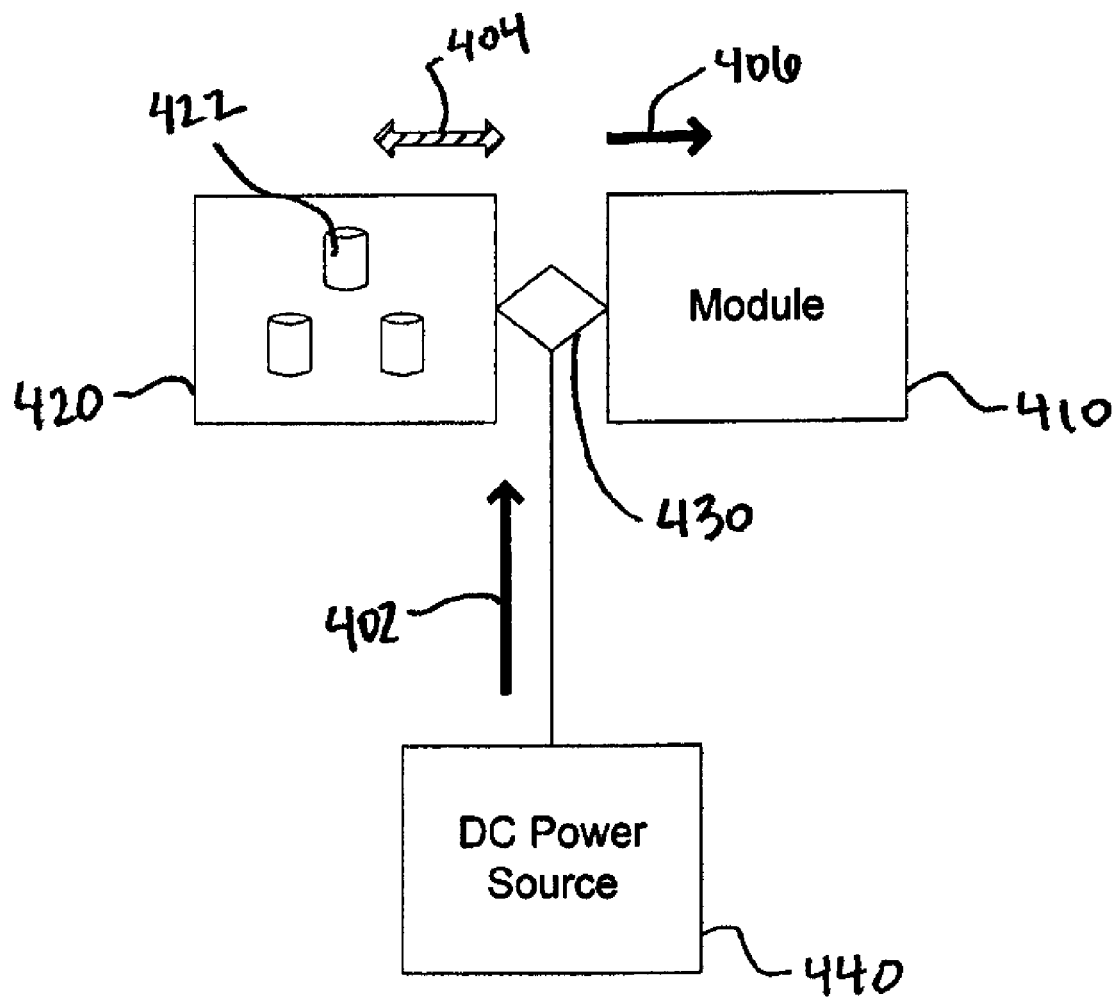
FIG. 4 is a schematic diagram of several components of an inverter configured in accordance with an embodiment of the disclosure.

FIG. 4 is a schematic block diagram of components of an inverter configured in accordance with an embodiment of the disclosure. In the illustrated embodiment, a module 410 and a PCB 420 are physically and electrically coupled directly to each other as well as to a bus structure 430. The PCB 420 includes one or more capacitors 422, and a DC power source 440 is coupled to the bus structure 430. In operation, current represented by a first arrow 402 flows from the DC power source 440 to the bus structure 430. From the bus structure 430, the current can flow through the PCB 420 as indicated by a second double headed arrow 404, or the current can flow directly to the module 410 as represented by a third arrow 406. At the PCB 220, the capacitors 422 can store and release energy to provide low impedance high frequency current as required by the module 410. Accordingly, the current can flow directly to the module 410, if needed, thus bypassing the PCB 420. If the module 410 does not need the current, the current can flow to the PCB 420 to be stored in the capacitors 422. The module 410 can accordingly draw current from the PCB 420 as needed or when the current is not available from the DC source 440.

The configuration illustrated in FIG. 4 accordingly does not require all of the current to pass through the PCB 420. Because there is less current passing through the PCB 420, there is less heat generated in the PCB 420 due to resistance. However conventional designs (e.g., as illustrated in FIG. 1) require that all of the current to pass through the PCB, regardless if it's being stored in the capacitors. As such, there are greater losses and heat generated with conventional designs. The embodiments described herein, however, result in less damage to the PCB 420 due to stress from the heat because all the current does not have to pass through the PCB 420 to reach the module 410. This results in less damage to the PCB 420 due to heat stresses and can therefore save costly repair or replacement time and money.

Figure 5:
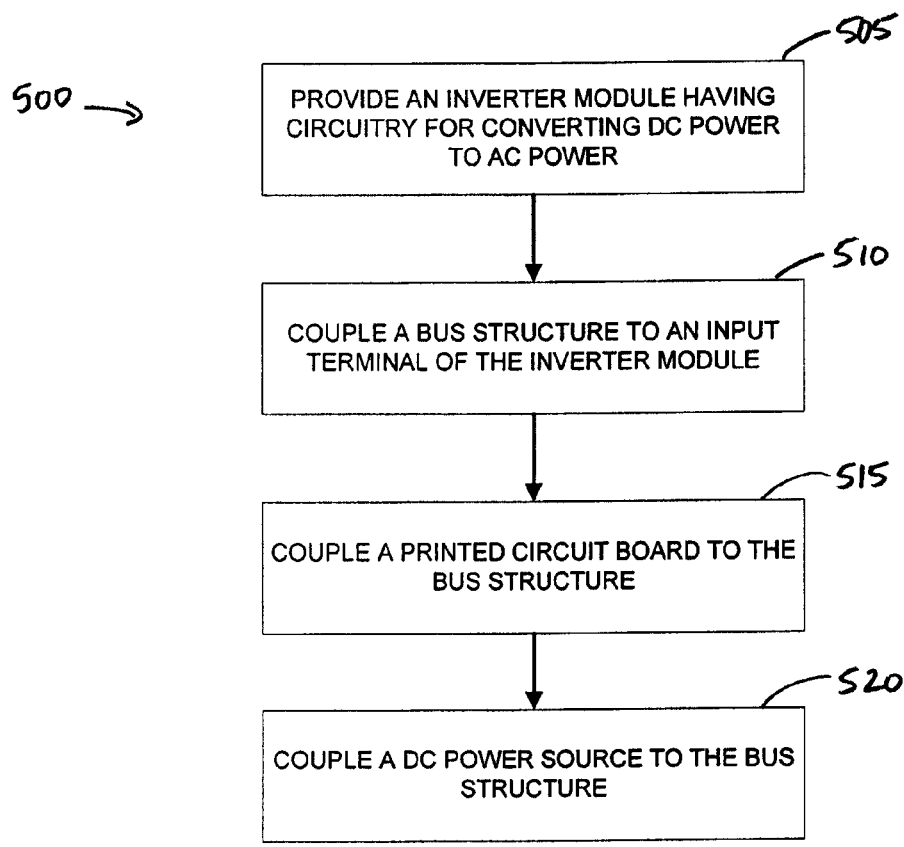
FIG. 5 is a flow diagram of a process of forming an inverter configured in accordance with an embodiment of the disclosure.

FIG. 5 is a flow diagram of an embodiment of a method or process 500 for forming an inverter for converting DC power to AC power. The process 500 includes providing an inverter module having circuitry configured for converting DC power into AC power (block 505). The inverter module includes an input terminal, and the process also includes coupling a bus structure to the input terminal (block 510). In certain embodiments, the bus structure is both physically and electrically coupled to the input terminal. For example, a conductive fastener (e.g., bolt, screw, etc.) can physically couple the bus structure to the input terminal with a conductive fastener and provide an electrical connection therebetween.

The process illustrated in FIG. 5 further includes coupling a printed circuit board to the bus structure (block 515) and coupling a DC power source to the bus structure (block 520). In certain embodiments, the printed circuit board is physically and electrically coupled to the bus structure. The printed circuit board is also electrically coupled to the input terminal. In certain embodiments, however, a contact area of the printed circuit board can also be physically coupled to the input terminal. For example, a conductive fastener can physically and electrically couple the contact area to the input terminal. In certain embodiments, coupling a printed circuit board to the bus structure also includes electrically coupling at least one capacitor carried by the printed circuit board to the bus structure and to the input terminal. The illustrated process 500 produces an inverter that does not require all of the source DC current to flow through the printed circuit board, although in certain embodiments it can. The illustrated method accordingly provides for reduced heat in the inverter and more reliable connections between the components thereof.

Figure 6:
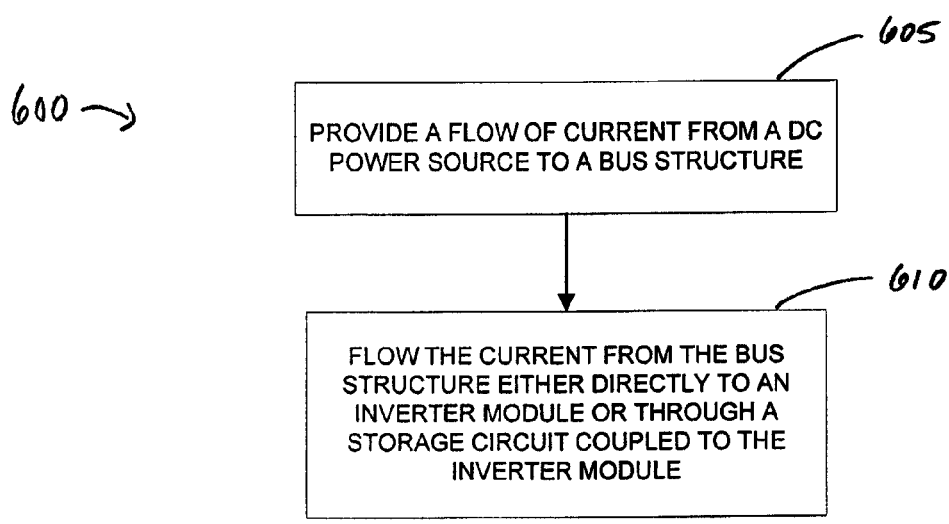
FIG. 6 is a flow diagram of a process of converting DC power to AC power with an inverter according to an embodiment of the disclosure.

FIG. 6 is a flow diagram of a process 600 for converting DC power to AC power with an inverter configured in accordance with an embodiment of the disclosure. The process 600 includes providing a flow of current from a DC power source to a bus structure (block 605). The bus structure operably couples an inverter module to a printed circuit board carrying a storage circuit. The process 600 further includes flowing the current from the bus structure either directly to the inverter module or through the storage circuit to the inverter module (block 610). Accordingly, in certain embodiments, if the inverter module requires the current, it can draw the current from the bus structure bypassing the storage circuit of the printed circuit board. If the inverter module does not require the current, the current can flow to the storage circuit such that the inverter module can draw the current from the storage circuit when the current is not available from the DC power source.

From the foregoing, it will be appreciated that specific embodiments of the disclosure have been described herein for purposes of illustration, but that various modifications may be made without deviating from the spirit and scope of the disclosure. For example, the bus structure 230 may have other configurations or include more bus bars than those illustrated in the Figures. Moreover, specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Accordingly, embodiments of the disclosure are not limited except as by the appended claims.

We claim:

1. A solar power inverter comprising:
   an inverter module configured to convert direct current (DC) from one or more photovoltaic arrays to alternating current (AC) usable by a utility grid, the inverter module having an input terminal;
   a printed circuit board carrying one or more capacitors, the printed circuit board having an electrically conductive contact area electrically coupled to the one or more capacitors; and
   a bus structure physically and electrically coupled to the input terminal and the electrically conductive contact area, wherein the bus structure is configured to be electrically coupled to the one or more photovoltaic arrays, and wherein the bus structure is further configured to receive the DC from the one or more photovoltaic arrays prior to receipt of the DC by the electrically conductive contact area.

2. The solar power inverter of claim 1 wherein the bus structure physically couples the electrically conductive contact area to the input terminal.

3. The solar power inverter of claim 2 wherein the bus structure further comprises an electrically conductive fastener that physically attaches the electrically conductive contact area directly to the input terminal.

4. The solar power inverter of claim 1 wherein the one or more components include one or more capacitors electrically coupled to the electrically conductive contact area, wherein the one or more capacitors comprise a storage circuit.

5. An electrical power inverter comprising:
   an inverter module for converting DC power to AC power, the module having an input terminal;
   a printed circuit board having an electrically conductive contact area electrically coupled to the input terminal; and
   a bus structure physically and electrically coupled to the input terminal and the contact area, wherein the bus structure is configured to be electrically coupled to a DC power supply, wherein the bus structure includes a plurality of positive bus bars and a plurality of negative bus bars, wherein each of the positive bus bars is attached to the input terminal and the printed circuit board, and wherein each of the negative bus bars is attached to the input terminal and the printed circuit board.

6. The inverter of claim 5 wherein the plurality of positive bus bars includes first, second and third positive bus bars, and the plurality of negative bus bars includes first, second and third negative bus bars.

7. A solar power inverter comprising:
   a bus structure configured to be operably coupled to one or more photovoltaic arrays;
   a printed circuit board having a contact site physically and electrically coupled to the bus structure;
   at least one capacitor, wherein the at least one capacitor is carried on the printed circuit board and operably coupled to the contact site; and
   an inverter module configured to convert direct current (DC) from the one or more photovoltaic arrays to alternating current (AC) usable by a utility grid, the inverter module having an input terminal physically and electrically coupled to the bus structure.

8. The solar power inverter of claim 7 wherein the input terminal is physically and electrically coupled to the contact site.

9. The solar power inverter of claim 7, further comprising a first electrically conductive fastener coupling the bus structure to the contact site and a second electrically conductive fastener coupling the bus structure to the printed circuit board and the input terminal.

10. The solar power inverter of claim 9 wherein the first and second fasteners include copper.

11. The solar power inverter of claim 7 wherein:
   the contact site is a first contact site and the printed circuit board further has at least a second contact site;
   the input terminal is a first input terminal and the inverter module further has at least a second input terminal; and
   the bus structure includes a plurality of positive bus bars and a plurality of negative bus bars, each of the positive and negative bus bars being physically and electrically coupled to a corresponding contact site and an input terminal.

12. A solar power inverter comprising:
   an inverter module configured to convert direct current (DC) from one or more photovoltaic arrays to alternating current (AC) usable by a utility grid;
   one or more components configured to store energy; and
   a bus structure configured to be operably coupled to the one or more photovoltaic arrays, wherein the bus structure is physically coupled to the inverter module, and wherein the bus structure electrically couples the inverter module to the one or more components.

13. The solar power inverter of claim 12, further comprising a printed circuit board carrying the one or more components and having an electrically conductive contact electrically coupled to the one or more components, wherein the bus structure is physically coupled to each of the inverter module and the electrically conductive contact with one or more electrically conductive fasteners.

14. A method of manufacturing a solar power inverter, the method comprising:
   coupling a bus structure to an input terminal of an inverter module, the inverter module configured to convert direct current (DC) from one or more photovoltaic arrays into alternating current (AC) usable by a utility grid, wherein the bus structure is physically and electrically coupled to the input terminal, and wherein the bus structure is configured to be operably coupled to the one or more photovoltaic arrays; and
   coupling a printed circuit board to the bus structure, wherein the printed circuit board is physically and electrically coupled to the bus structure and electrically coupled to the input terminal, wherein the printed circuit board carries one or more components configured to store energy, and wherein the bus structure electrically couples the one or more components to the input terminal.

15. The method of claim 14, further comprising physically coupling the printed circuit board to the input terminal.

16. The method of claim 14 wherein coupling a printed circuit board to the bus structure includes electrically coupling the one or more components carried by the printed circuit board to the bus structure and to the input terminal.

17. The method of claim 14 wherein:
coupling the bus structure to the input terminal includes coupling the bus structure to the input terminal with a first conductive fastener; and
coupling the printed circuit board to the bus structure includes coupling the printed circuit board to the bus structure with a second conductive fastener.

18. A method, performed by a solar power inverter, of flowing direct current (DC) to an inverter module, the method comprising:
flowing DC from one or more photovoltaic arrays to a bus structure of the solar power inverter, wherein the bus structure operably couples a storage circuit of the solar power inverter to an inverter module of the solar power inverter, wherein the inverter module is configured to convert the DC into AC usable by a utility grid; and
after flowing the DC to the bus structure, flowing the DC from the bus structure either to the inverter module or to the storage circuit.

19. The method of claim 18, further comprising: storing energy in the storage circuit; and
flowing DC from the storage circuit to the inverter module.

20. The solar power inverter of claim 1 wherein the bus structure includes a plurality of positive bus bars and a plurality of negative bus bars, wherein each of the positive bus bars is attached to the input terminal and the electrically conductive contact area, and wherein each of the negative bus bars is attached to the input terminal and the electrically conductive contact area.

* * * * *